(12) United States Patent
James (10) Patent No.: US 7,876,718 B1
(45) Date of Patent: Jan. 25, 2011

(54) ECHO REDUCTION

(75) Inventor: James H. James, Farmingdale, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 528 days.

(21) Appl. No.: 11/594,599

(22) Filed: Nov. 8, 2006

Related U.S. Application Data (63) Continuation of application No. 10/010,118, filed on Dec. 6, 2001, now Pat. No. 7,154,867.

(51) Int. Cl.
*H04B 3/20* (2006.01)
*H04M 9/08* (2006.01)

(52) U.S. Cl. .................................. 370/287; 379/406.07

(58) Field of Classification Search ........................ None
See application file for complete search history.

(56) References Cited

U.S. PATENT DOCUMENTS 5,668,871 A * 9/1997 Urbanski ............... 379/406.07
7,061,877 B1 * 6/2006 Gummalla et al. .......... 370/278

* cited by examiner

*Primary Examiner*—Melanie Jagannathan (57) ABSTRACT

This invention provides a technique to reduce echoes not adequately attenuated by echo cancellers during initial periods of voice communication. Signals transmitted across communication networks are often reflected back to the caller resulting in echo. Echo cancellers are employed in the communication system to cancel this effect in order to maintain a high quality transmission. However, echo cancellers require time to detect, adapt, and effectively remove echo, often resulting in echo during the initial moments of the call and thereby degrading the quality of service. By installing an attenuation device into the communication system, all signals that pass through it are reduced to a preset value for a set period of time. This reduces any echo below a detectable threshold. After the period of time expires, the attenuation device allows the signal to pass unaffected, by which time the echo cancellers have adaptively adjusted to any echoes in the system.

4 Claims, 9 Drawing Sheets

ECHO REDUCTION

CROSS-REFERENCE TO RELATED APPLICATIONS

This application is a continuation of application Ser. No. 10/010,118 filed Dec. 6, 2001, now U.S. Pat. No. 7,154,867 the entire disclosure of which is hereby incorporated herein in its entirety, and claims all benefits relating thereto the same under 35 USC 120 and other applicable sections.

BACKGROUND OF THE INVENTION

1. Field of Invention

This invention relates to echo reduction.

2. Description of Related Art

Echoing in signal transmission is a well known phenomena. Devices such as echo cancellers adaptively adjust to transmission medium conditions such as transmission delay, etc., to remove echoes. With increasing network varieties, the transmission medium characteristics require additional improvements to obtain high quality signal transmissions.

SUMMARY OF THE INVENTION

An echo reduction device reduces echoes starting at the beginning of a communication. The echo reduction is applied until other devices such as echo cancellers can effectively cancel echo signals by adapting to the transmission environment.

For example, in a telephone system, when a call is initiated, a finite amount of time occurs between the beginning of the call and when echo cancellers are able to cancel out echo signals. During this time, echo signals may be heard and degrade signal transmission quality. This invention reduces the echo signal by reducing all signals of the call until the echo cancellers are able to cancel the echo signals.

The echo may be reduced for a predetermined amount of time after commencement of the communication. For example, a timer may be provided that is initialized to a predetermined value at the commencement of the communication. All the signals of the communication may be attenuated to reduce amplitudes of the echo signals until the timer expires. Other techniques may also be used to control the attenuation of the communication signals. For example, the echo cancellers may output echo canceller signals to an attenuator device to indicate a degree of echo cancellation that has been achieved. Such signals may be based on an error signal commonly used in adaptive weight update process of echo cancellers, for example.

In addition, a degree of attenuation may be adjusted during the time that attenuation is applied. For example, in voice communications, a sensitivity of a person to echoes may increase with time from the beginning of a call. Thus, attenuation of all signals may correspondingly increase with time until echo cancellers can cancel echo signals. Also, specific performances of echo cancellers may be known and a profile of percentage of echo cancellation over time from the commencement of the communication may be known. Thus, the degree of attenuation may be varied based on the percentage of echo cancellation that is expected to be achieved by the echo cancellers. For example, no attenuation is needed between the commencement of the communication and a shortest time that an echo signal can be detected. Then, attenuation may increase to a maximum attenuation and then the attenuation may be gradually decreased until the attenuation value reaches zero (i.e., when echo cancellers fully cancel echo signals). In this way, a high quality of signal transmission may be maintained without excessively attenuating the communication signals.

BRIEF DESCRIPTION OF THE DRAWINGS

The invention will be described, with reference to the following figures, wherein like numerals represent like elements, and wherein.

DETAILED DESCRIPTION OF PREFERRED EMBODIMENTS

When a signal is transmitted over a transmission line, the phenomena "called echoing" occurs due to reflection of the signal caused by impedance discontinuities, hybrid circuits, etc. To remove such echoes, telecommunications networks include devices such as echo cancellers that are installed to cancel the echoing effect so that a high quality signal transmission may be obtained.

Echo cancellers are adaptive devices and may set weights based on a current transmission condition so that echoes may be detected and removed. Echo cancellers take time to adaptively set its weights. Such time is dependent upon signal propagation time for a particular transmission medium. Usually, the time required to achieve effective echo cancellation is short and any echoes that are not canceled during initial moments of a signal transmission do not significantly affect the quality of the signal transmission.

For example, if the communication system is a telephone system, the echo cancellers begin adapting to the connection circuit immediately after the connection between the calling and the called parties is made. The time required for the echo cancellers to adequately cancel the echoes is less than a detectable threshold so that the calling and called parties do not notice the echoes that escape cancellation. Thus the quality of the communication between the calling and called parties is not affected. However, if the time required for the echo cancellers to adequately cancel the echoes is increased (i.e., as dictated by the conditions of the transmission medium) to exceed the detectable thresholds, the quality of service degrades. This invention provides a technique to reduce the echoes that are not canceled during an initial period of a communication before the echo cancellers are able to cancel the echoes.

Figure 1:
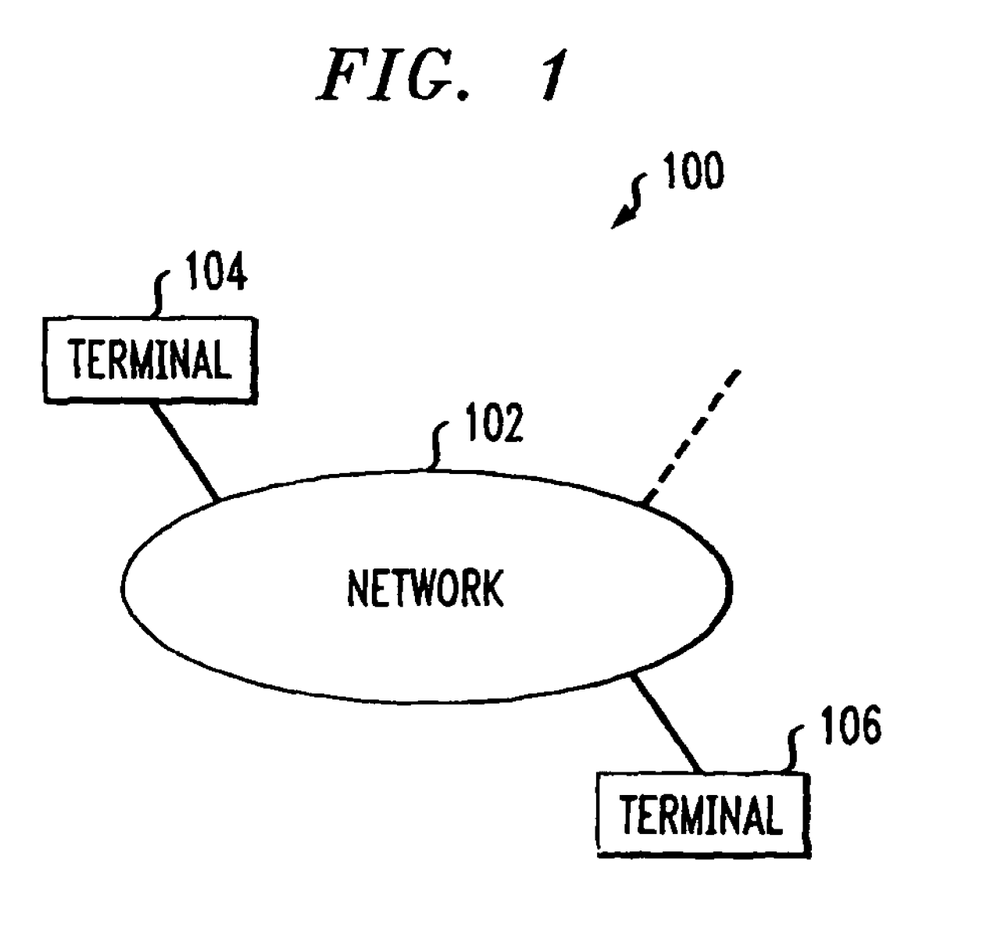
FIG. 1 shows an exemplary communication system.

FIG. 1 one shows an exemplary communication system 100 that includes a network 102 and terminals 104-106. While the network 102 is shown as a single entity, in actuality, such a network 102 may include many networks interconnected to each other. When the terminal 104 desires to communicate with the terminal 106, the communication may be routed through the network 102 via paths that may traverse many different types of networks. For example, one of the networks may be a data network using the Internet Protocol (IP). When such a network is used to transmit information, the delay time may be significantly increased so that an amount of time required for echo cancellers to adaptively adjust the weights to adequately cancel out echo signals may be relatively long (e.g., in the order of 0.5 second). When this occurs, the effect of echoes may be detected by callers in a telephone network system, for example.

Figure 2:
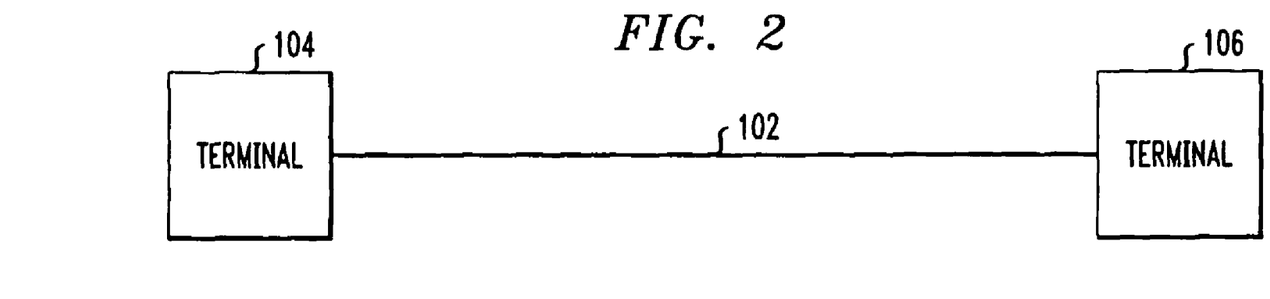
FIG. 2 shows FIG. 1 in a reduced form.
Figure 3:
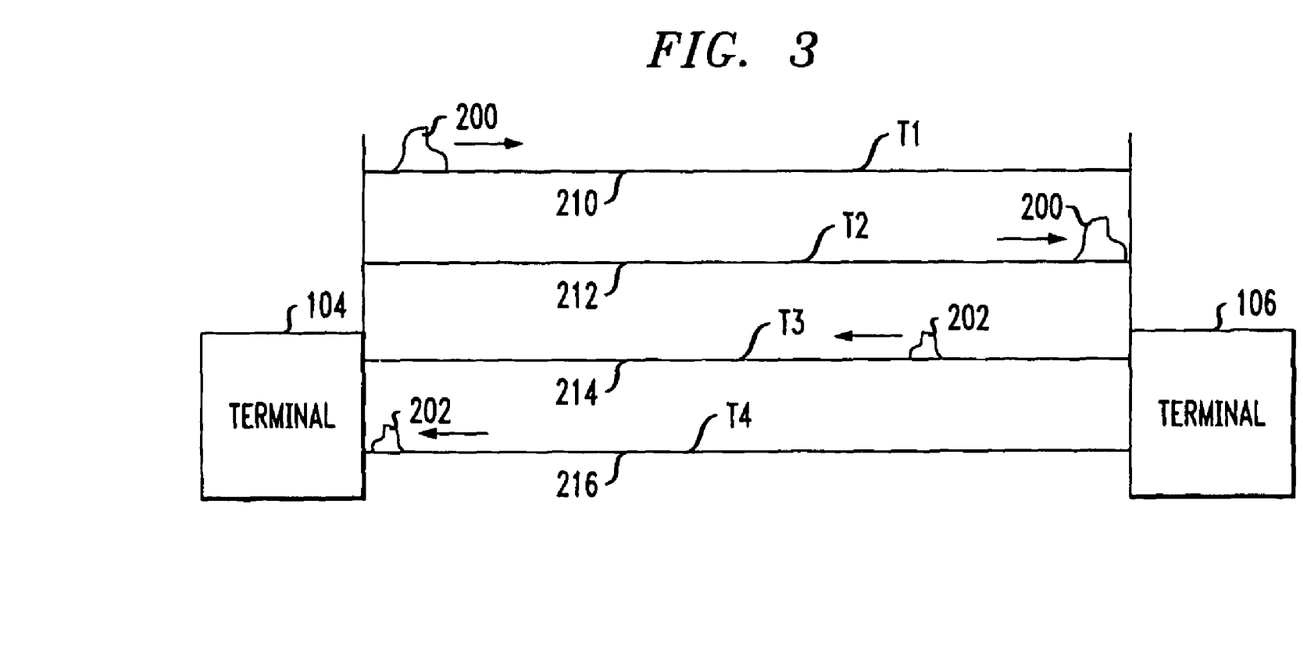
FIG. 3 shows exemplary snap shots of communication and echo signals for the system of FIG. 2.

FIGS. 2-5 provide pictorial examples of the echo effect. FIG. 2 condenses the network into a single line so that the terminals 104 and 106 are connected by the line 102 (network). FIG. 3 shows snap shots 210-216 of a signal 200 transmitted by the terminal 104 to the terminal 106 and an echo signal 202 that is reflected back from a portion of the network 102 near the terminal 106, for example.

At snap shot 210, the signal 200 (e.g., a voice signal such as "hello") is transmitted from the terminal 104 to the terminal 106. At snap shot 212, the signal 200 reaches the end of the network 102 at the terminal 106. However, because of the reflection effect, the signal the 200 is reflected back from the end of the network 102 at the terminal 106 as an echo signal 202 shown in snap shot 214 traveling from the terminal 106 to the terminal 104. At snap shot 216, the echo signal 202 reaches the terminal 104.

As may be noted in FIG. 3, the echo signal 202 has a similar shape as the original signal 200 but at a much reduced amplitude. Because there is a time separation between the snap shot 210 and the snap shot 216, the terminal 104 receives a faint replica (echo signal 202) of the original signal 200 at a later time.

Figure 4:
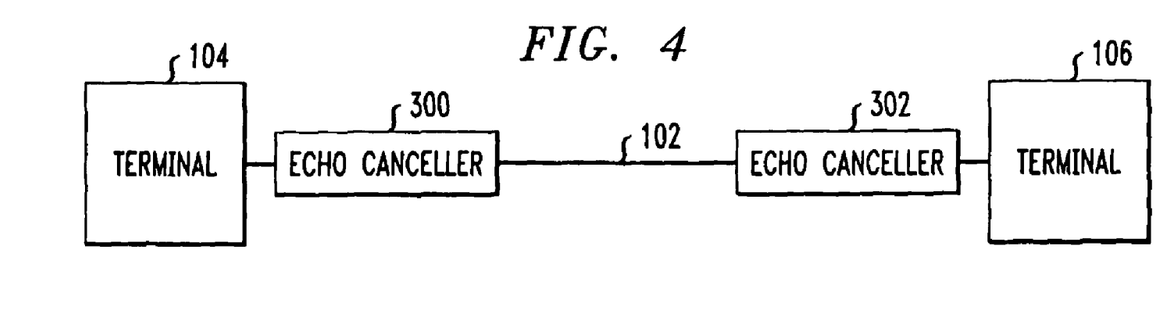
FIG. 4 shows an exemplary communication system that includes echo cancellers.

FIG. 4 shows the network 102 with echo cancellers 300 and 302 added. In such a case, the echo cancellers 300 and 302 adapt to the conditions of the network 102 so that echo signals may be canceled.

Figure 5:
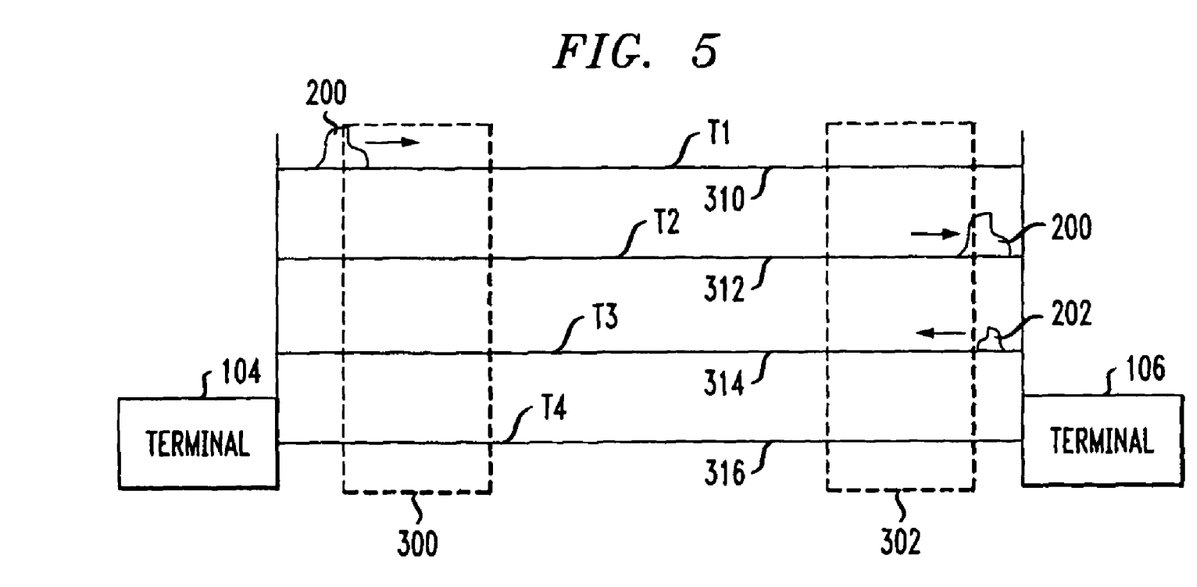
FIG. 5 shows exemplary snap shots of communication and echo signals for the system of FIG. 4.

As shown in FIG. 5, snap shots 310-316 show the transmission of the signal 200 and the echo 202 through the echo cancellers 300 and 302. At snap shot 310, the signal 200 is transmitted from the terminal 104 to the terminal 106. At snap shot 314, the echo 202 is reflected from the end of the network 102 at the terminal 106 to the terminal 104. However, at the snap shot 316, the echo canceller device 302 removes the echo 202 so that the echo signal 202 is not transmitted to the network 102 and thus the terminal 104 does not receive the echo signal.

Figure 6:
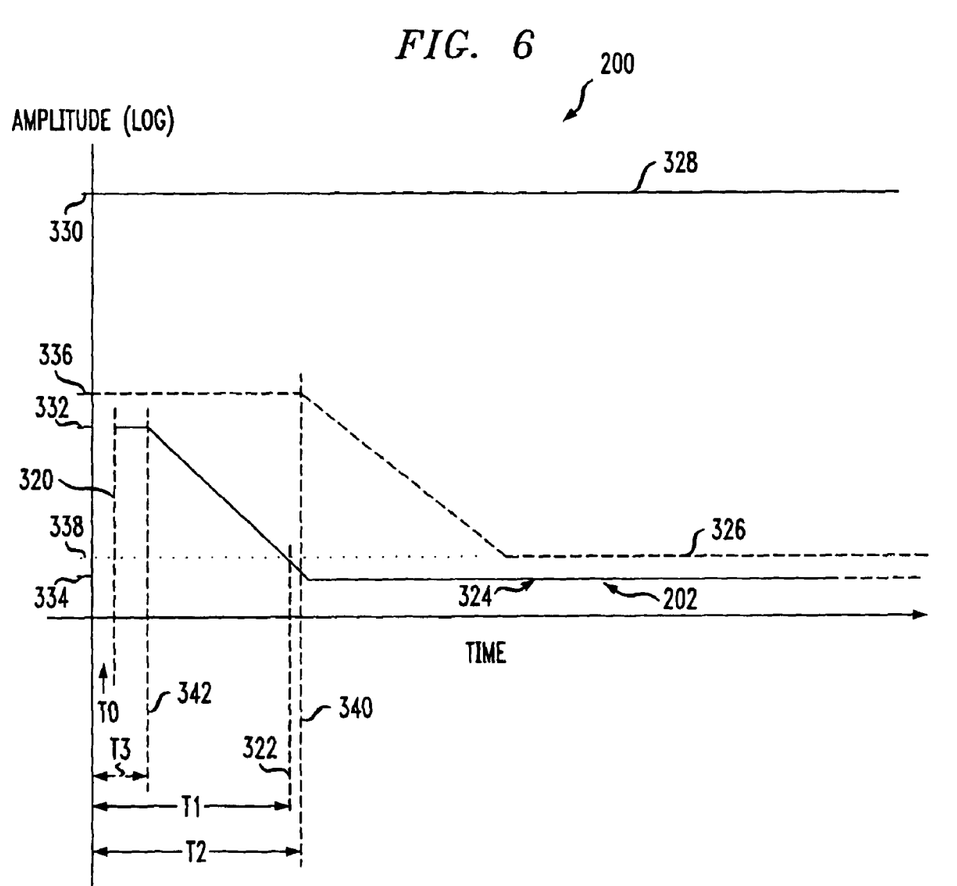
FIG. 6 shows an exemplary amplitude/time diagram of the communication signal and the echo signal with echo cancellation and short signal delay times.

FIG. 6 shows an amplitude/time diagram of the transmitted signal 200 and the echo signal 202 at the end of the network 102 near the terminal 104. The line 328 represents an amplitude of the transmitted signal 200 and the line 324 represents an amplitude of the echo signal 202. Throughout the communication, the transmitted signal 200 is transmitted at an amplitude level 330. After a time interval T0, as indicated by the dashed line 320, the echo signal 202 arrives at the transmitting terminal having an amplitude level 332. After a time period T3, as indicated by the dashed line 342, the echo canceller 300 begins to adapt to the transmission conditions until time period T1, as indicated by the dashed line 322, when the amplitude of the echo signal 202 is reduced to below a steady state portion of a threshold 326.

The threshold 326 may be a threshold below which a human ear cannot detect the echo signal 202, for example. As shown, the threshold 326 may be represented by a line that changes value with time because the detector may be non-linear over time such as a human ear. For example, a person's ability to detect an echo signal improves with time from the commencement of a communication. At the beginning of a call, for example, a person expects some sounds (clicks, etc.) that are connection-related. In addition, it takes time for a person to adapt to the voice channel. However, after an initial time period (T0), a person becomes more attentive and, perhaps, the ear (and the neural processes) becomes more adapted to the connection and is able to better detect signals on the line. This phenomena may be represented by a decrease of the threshold 326 until the steady state portion is reached where signals below the threshold 326 are below a noise level and are essentially undetectable by the human ear.

Returning to FIG. 6, the dashed line 340 indicates a time threshold T2 before which the echo signal 202 is assumed to be undetectable at the transmitting terminal (i.e., the echo signal amplitude is always less than the threshold 326). For example, if the transmitting terminal is a telephone station and a user of the telephone station is the detector, then any echo signals that occur in a time period less than the time threshold T2 would not be detectable by the user. T2 may be about 500 ms, for example. Thus, the conditions shown in FIG. 6 represent an acceptable performance of the echo cancellers which reduce the echo signals 202 to below a detectable amplitude threshold 326 after a time period T1 that is less than the time threshold T2.

Figure 7:
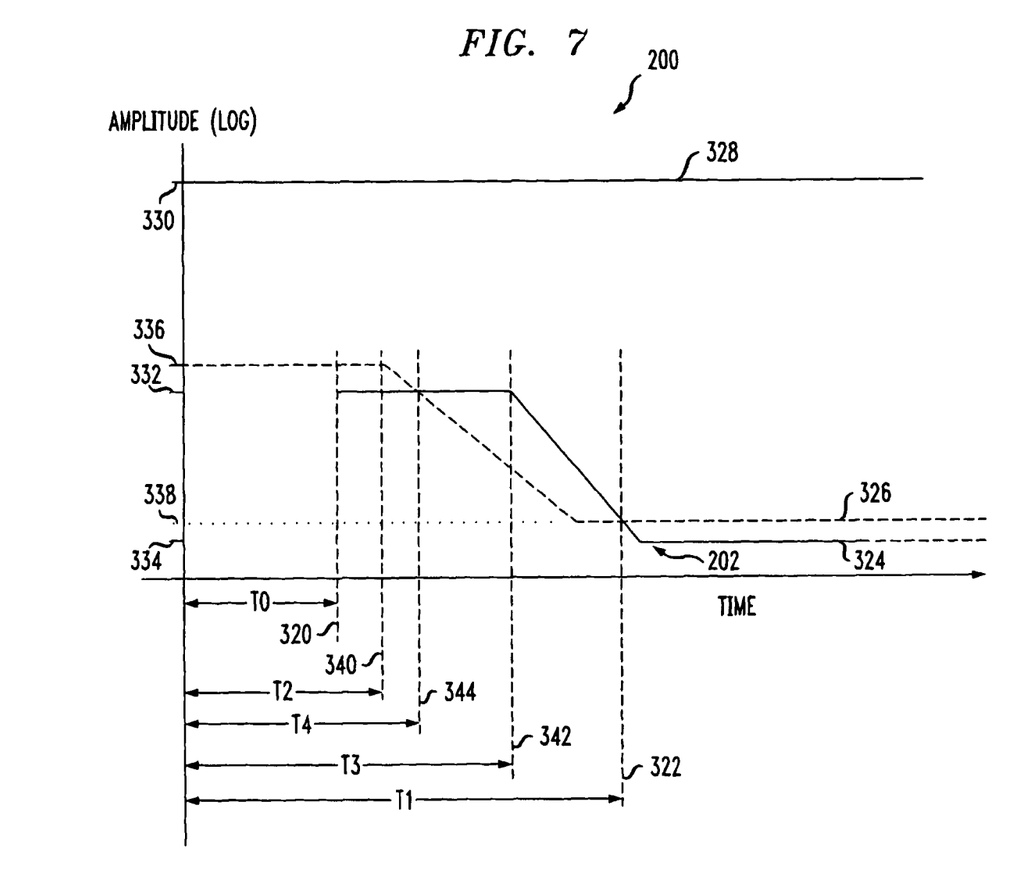
FIG. 7 shows an exemplary amplitude/time diagram of the communication signal and the echo signal with echo cancellation and long signal delay times.

FIG. 7 shows conditions of the echo signal 202 when a larger delay is experienced over the transmission medium so that the time period T0 is extended as shown. Due to the larger delay, the echo signals 202 are also delayed and arrive at the terminal 104 after the longer time period T0. The echo cancellation of the echo canceller 300 also appears delayed so that time periods T1 and T3 appear much later from the commencement of the communication than before, as shown in FIG. 6. Unfortunately, the threshold 326 remains the same relative to the start of the communication, so that after a time period T4, the echo signals 202 are detectable until the time period T1, when echo canceller 300 is able to reduce the echo signals 202 to below the threshold 326. This invention reduces the amplitude of echo signal 202 between the time periods T0 and T1 so that the quality degradation during this time is also reduced.

Figure 8:
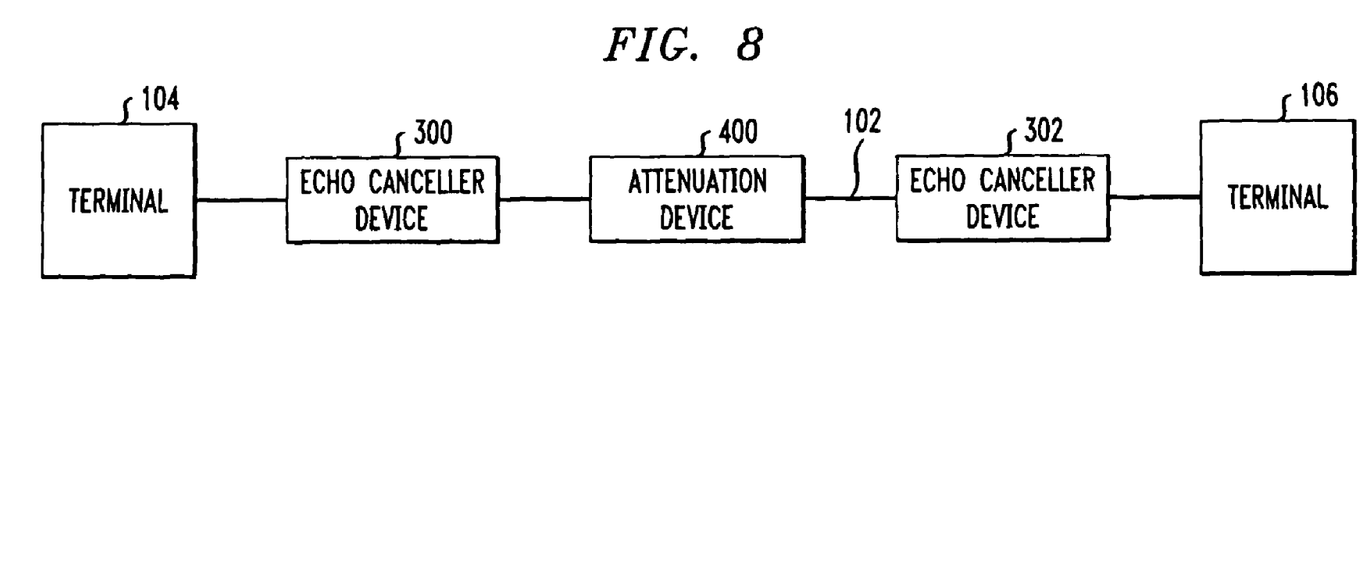
FIG. 8 shows an exemplary communication system that includes echo cancellers and echo reduction devices.

FIG. 8 shows an attenuation device 400 disposed between the echo cancellers 300 and 302. The attenuation device 400 attenuates all signals transmitted or received via the network 102 for a period of time that is required for the echo cancellers 300 and 302 to adequately reduce the echo signal 202.

Figure 9:
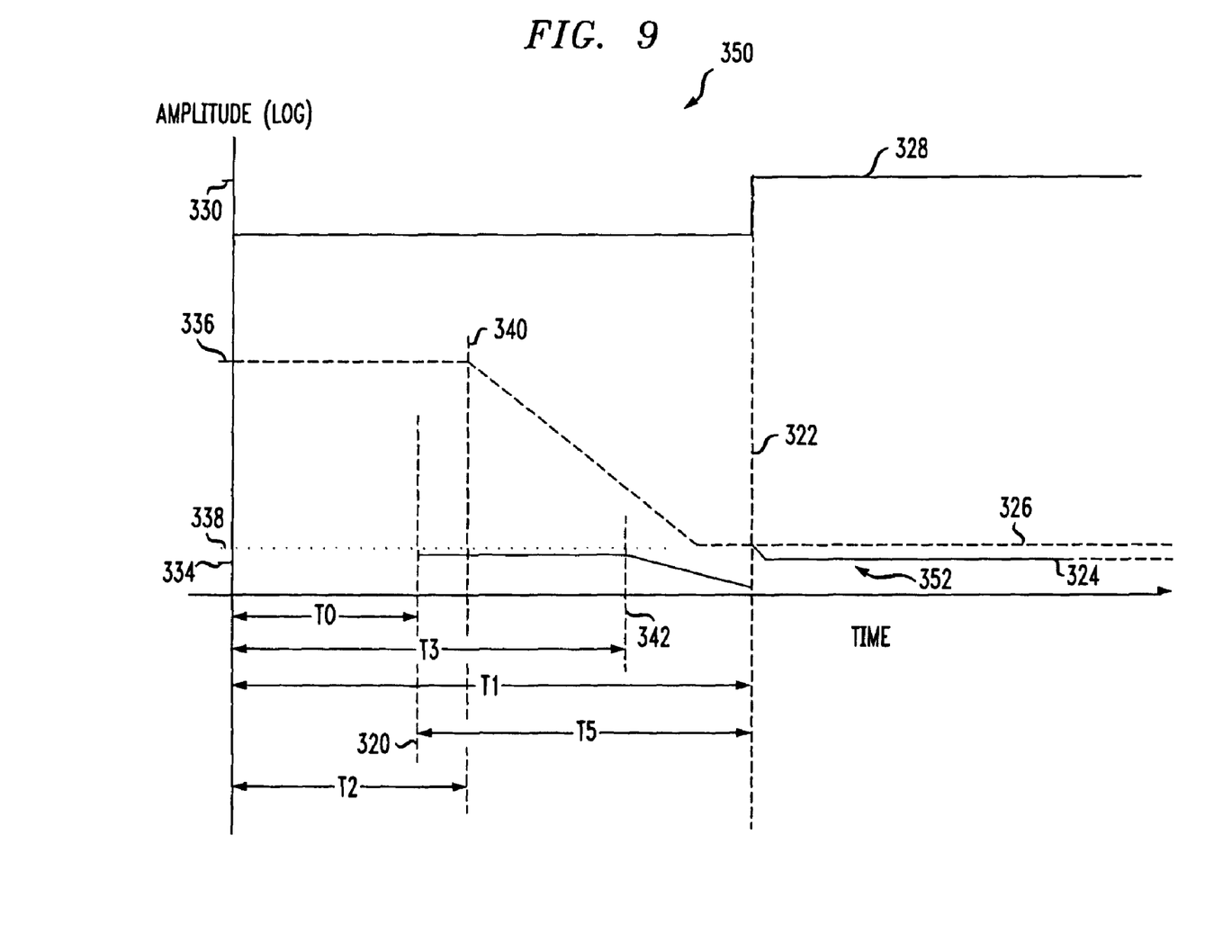
FIG. 9 shows an exemplary amplitude/time diagram for the system of FIG. 8.

FIG. 9 shows an amplitude/time diagram of a transmitted signal 350 and an echo signal 352 when the attenuation device 400 is used. As shown, both the signal 350 and echo signal 352 are reduced in amplitude during the time period T5. For the example shown in FIG. 9, the amount of attenuation is set so that the amplitude of the echo signal 352 is reduced to be below the threshold 326 during the period T5. After the period T5, the attenuation is removed so that signal amplitude of the signal 350 and the echo signal 352 return to their non-reduced level. Since the echo canceller 300 has adequate to time to reduce the amplitude of the echo signal 352 to below the threshold 326, the amplitude of the echo signal 352 never exceeds the threshold 326. Thus, the quality of transmission during the period T1 is not reduced by the echo signal 352.

While FIG. 9 shows that the attenuation is sufficient to reduce the echo signal 352 to below the threshold 326, the amount of the attenuation may be set to other values so that any desirable quality of transmission may be achieved. Because the transmitted signal 350 is also attenuated along with the echo signal 352, it may be desirable to tolerate a small amount of echo signal 352 so that the transmitted signal may not be overly attenuated. Also, while the amount of attenuation is shown to be a fixed value over the time period T3, variable attenuation values may be used.

For example, the signal does not need to be attenuated at all during the time period between T0 and T4 (see FIG. 7) since any echo signals occurring in this period would not affect the quality of transmission. After the period T4, the echo signal 202 may be reduced with an increased amount of attenuation to follow the falling threshold 326. After time period T3, the amount of attenuation may be reduced because the echo canceller 300 may cancel a progressively greater amount of the echo signal 352 toward the end of the period T1. Thus, depending on the specific circumstances, the amount of attenuation may be varied throughout the period T5 to achieve a desirable performance.

Figure 10:
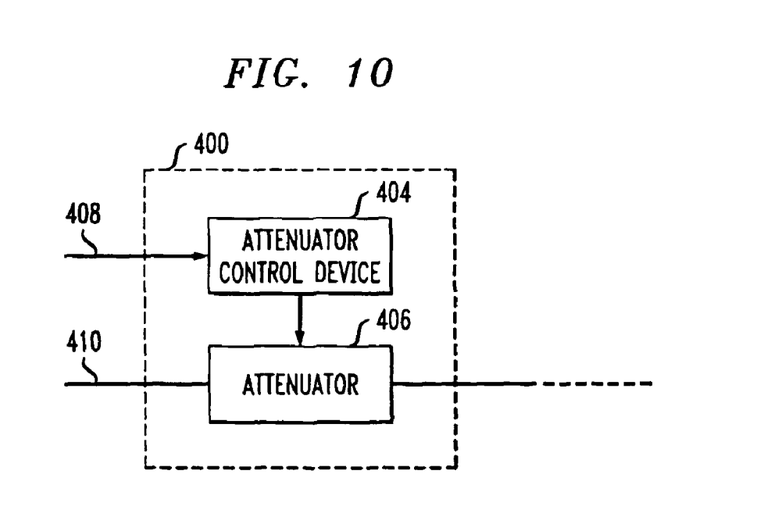
FIG. 10 shows an exemplary block diagram of an attenuation device.

FIG. 10 shows an exemplary block diagram of the attenuation device 400. The attenuation device 400 may include an attenuator control device 404 and an attenuator 406. The attenuator control device 404 may be implemented in many different ways. For example, if the attenuation device 400 is adapted for a simple analog application, the attenuator control device 404 may be simply a timer that generates a time delay corresponding to the period T5 shown in FIG. 9, for example. Thus, during the period T5, the attenuator control device 404 (timer) outputs a signal that sets an attenuation value of the attenuator 406 to be a preset amount. When a communication begins, a signal is received from the signal line 408 to start the attenuator control device 404 (timer). During the period T5, the attenuator control device 404 outputs a signal to the attenuator 406 to attenuate all signals passing through the transmission medium 410 to a preset attenuation value. After the period T5 expires, the attenuator control device 404 either outputs a different signal to the attenuator 406 or resets the signal that was outputted to the attenuator 406, thus causing the attenuator 406 to reduce the attenuation value to a smaller value, such as 0 attenuation value, for example.

As discussed above, the attenuator control device 404 may also implement more complex schemes such as varying the attenuation value of the attenuator 406 throughout the period T5 so that desirable signal quality may be achieved.

In addition, the attenuator control device 404 may receive a signal from an associated echo canceller 300, 302 so that the echo canceller 300, 302 may inform the attenuator control device 404 of a more accurate time when an adequate echo cancellation has been achieved. The echo canceller 300, 302 may also output an estimate of percentage of echo cancellation that is achieved at any moment (e.g., error signal) so that the appropriate attenuation value may be set for the attenuator 406.

Figure 11:
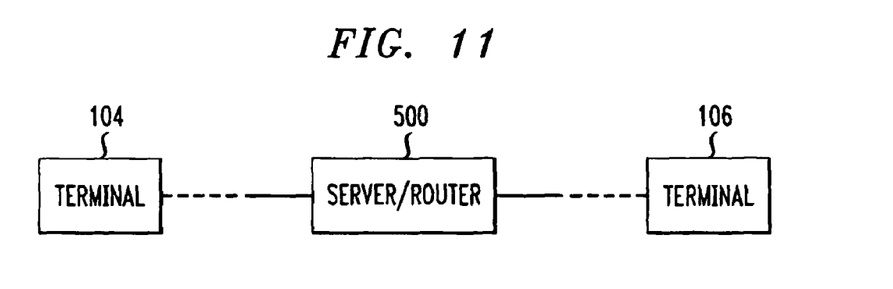
FIG. 11 shows an exemplary diagram where a server/router serves as the echo reduction device.

FIG. 11 shows a configuration where the attenuation device 400 may be a server/router 500 implemented in a data network when the communication is routed through the data network such as voice over IP. In such a case, the function of the attenuation device 400 may be performed by a server or a router of the data network, for example, when the server/router 500 is in the path of the transmission medium that is providing communication between the terminals 104 and 106. The server/router 500 may attenuate the signals as they are received.

For example, if the signal transmitted through the server/router 500 is expressed in binary values, then the attenuation device 400 implemented using the server/router 500 may multiply the binary value by an attenuation value before forwarding the signal to its destination. The attenuation amount is the multiplying factor which may be set to a value of 1 for no attenuation or a fractional value for reducing the amplitude of the signal.

The attenuation may also be performed by making a number of right shifts of the binary value to achieve a power of two attenuation. For example, if the attenuation factor is one half, then the binary value may be shifted right by one bit.

Figure 12:
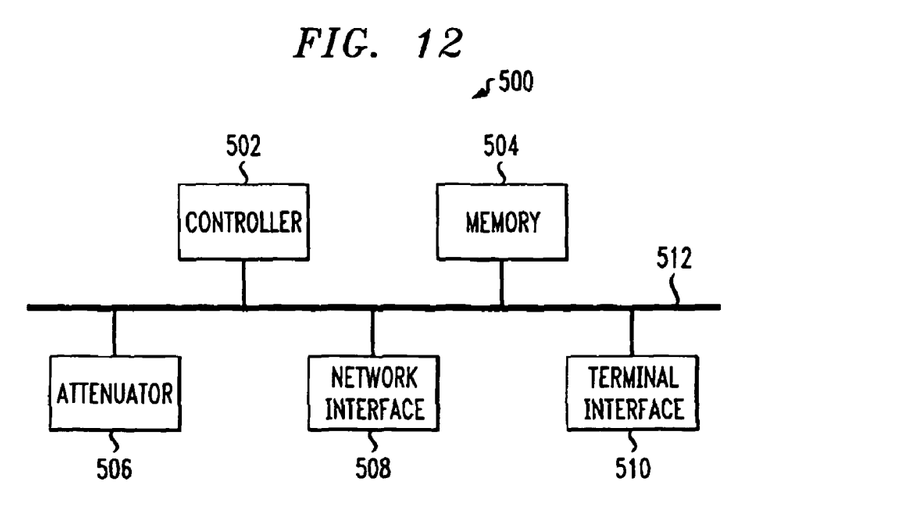
FIG. 12 shows an exemplary diagram of the server/router performing functions of an attenuation device.

FIG. 12 shows an exemplary block diagram of the server/router 500 which may include a controller 502, a memory 504, and an attenuator 506, a network interface 508 and a terminal interface 510 (optional). The above components may be coupled together via bus 512.

While FIG. 12 shows the attenuator 506 as a separate unit, the functions performed by the attenuator 506 may be performed by the controller 502. The terminal interface 510 is required if the server/router 500 interfaces with a terminal 104, 106. If the server/router 500 does not interface with a terminal 104, 106, then the terminal interface 510 is not needed.

The signals transmitted between the terminals 104 and 106 may be received by the server/router via the network interface 508. The controller 502 may determine if the received signals (now in digital data form) should be processed by the attenuator 506. If attenuation should be performed, the controller 502 sends the data portion of the received data to the attenuator 506.

The controller 502 may determine whether attenuation should be performed based on transmission conditions. For example, if a timer process is implemented, the controller 502 initializes a timer when a new communication commences. The data of the communication is sent to the attenuator 506 for attenuation until the timer expires. After the timer expires, the controller 502 sends the received data to other units along the transmission path without any attenuation.

As discussed above, other techniques may also be applied such as receiving a signal from the echo cancellers 300, 302 to determine when to stop attenuating the transmitted data; sending an attenuation parameter to the attenuator 506 based on a time since the commencement of the communication so that a variable attenuation value based on a desired level of transmission quality may be implemented; and/or receiving parameters from the echo canceller 300, 302 relating to a percentage of reduction of the echo signal 202 so that an appropriate attenuation value may be sent to the attenuator 506. Any combination of the above techniques may be selected based on specific circumstances of a particular implementation.

Figure 13:
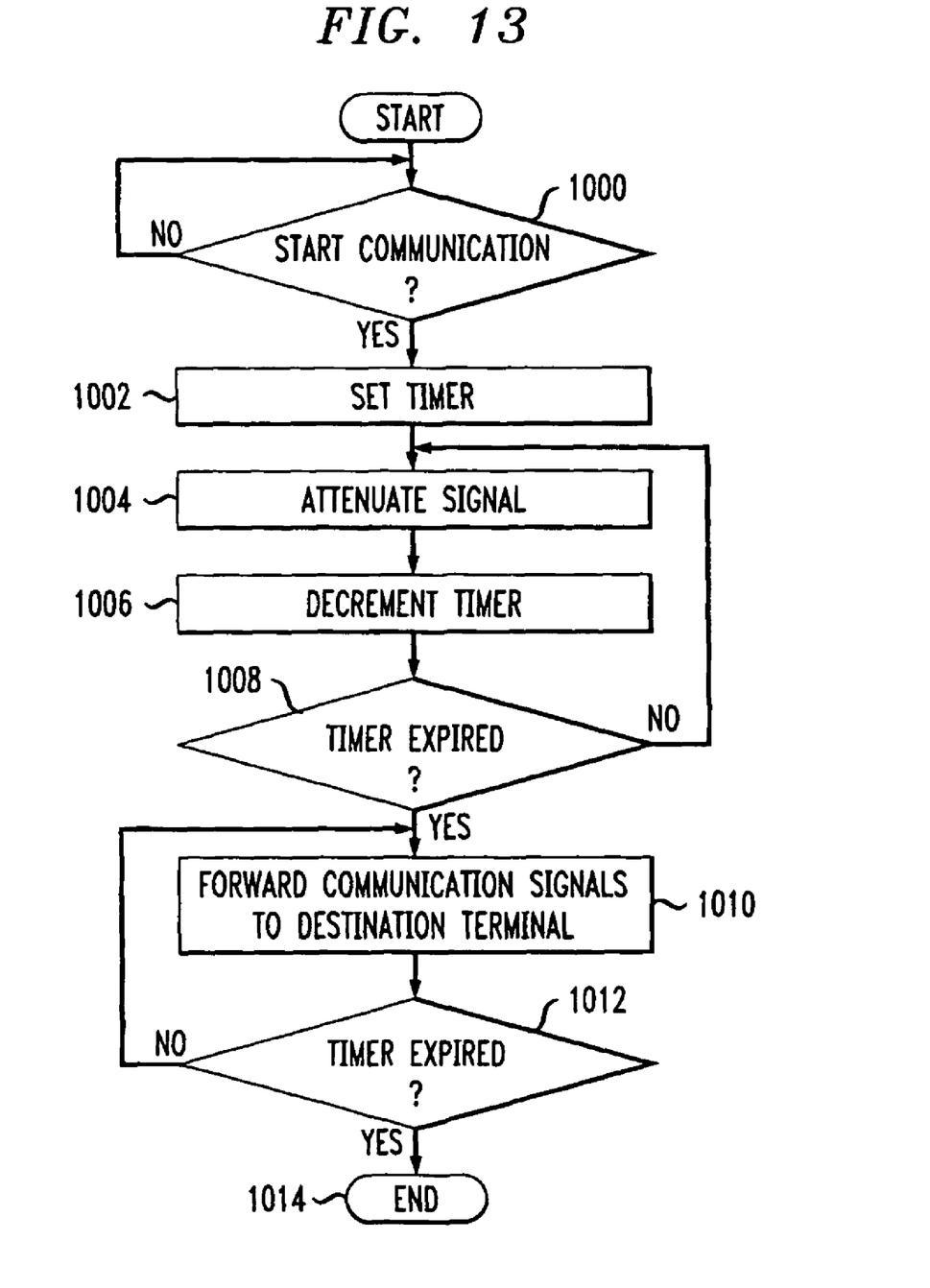
FIG. 13 is an exemplary flowchart of a server/router echo reduction functional process.

FIG. 13 shows an exemplary flowchart of a process of the server/router 500 that implements a timer for timing a period of signal attenuation from commencement of a communication to a time when the echo canceller 300, 302 adequately reduces the echo signal 202. In step 1000, the controller 502 determines whether a communication has commenced. If commenced, the controller 502 goes to step 1002; otherwise, the controller 502 returns to step 1000. In step 1002, the controller 502 sets a timer and goes to step 1004.

In step 1004, the controller 502 attenuates the received signal value by sending the signal value to the attenuator 506 and goes to step 1006. In step 1006, the controller 502 decrements the timer and goes to step 1008. In step 1008, the controller 502 determines whether the timer has expired. If expired, the controller 502 transmits the remaining communication signals to the destination device without attenuating the signal and goes to step 1010. If the timer has not expired, the controller 502 goes to step 1004.

In step 1010, the controller 502 forwards the received signal data to the destination device and goes to step 1012. In step 1012, the controller 502 determines whether the communication has ended. If ended, the controller 502 goes to step 1014 and' ends the process; otherwise, the controller 502 returns to steps 1010.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A method for echo reduction of echo caused by reflection of communication signals in a transmission medium, comprising:
    detecting a start of a call;
    detecting an echo signal;
    in a single attenuation device including an attenuation control device and an attenuator, concurrently attenuating communication signals of the call, including a transmitted signal and a received signal, at a same non-zero maximum attenuation beginning at said detecting of said echo signal in a shortest possible time;
    attenuating the communication signals of the call, after the single maximum attenuation is achieved, in a single decreasing function until an attenuation value reaches zero; and
    after performing the attenuating steps once, maintaining the attenuation value at zero for a remainder of the call.

2. The method for echo reduction of claim 1, further comprising:
    varying a degree of attenuation of the attenuating the communication signals of the call, based on a percentage of echo cancellation that is expected to be achieved by echo cancellers over time.

3. An apparatus for echo reduction of echo caused by reflection of communication signals in a transmission medium in voice over internet phone networks comprising:
    a single attenuation device for concurrently attenuating of signals both transmitted and received between at least two terminals, the attenuating of the transmitted and received signals being at a same non-zero maximum attenuation, said attenuation device having a controller;
    a memory device;
    a network interface;
    at least one terminal interface for interfacing of said at least two terminals;
    the controller being for initializing a timer upon determination of commencement of a call and for continually determining whether said attenuating of signals received between said at least two terminals should be performed by said attenuation device based on transmission conditions, and for maintaining the attenuation value at zero for a remainder of the call after a determination is made to cease performing attenuation.

4. An apparatus for echo reduction in voice over internet phone networks comprising:
    a timer for initializing timing at the commencement of a call and for establishing an expiration time;
    a controller for determining a commencement of the call, for decrementing the timer, for determining a termination of the call, and for establishing and transmitting an attenuator parameter based on a time since commencement of the call;
    a terminal for receiving and transmitting a plurality of signals;
    a single attenuator for continual attenuation of the plurality of signals as received and transmitted from the terminal, the attenuator providing the continual attenuation of the plurality of received and transmitted signals according to the attenuator parameter as received from the controller until a determination has been reached that the expiration time has been reached, and ceasing the attenuation thereafter; the continual attenuation being performed on the received and transmitted signals at a same non-zero maximum attenuation.

* * * * *